United States Patent
Lin et al.

(10) Patent No.: US 11,947,402 B2
(45) Date of Patent: *Apr. 2, 2024

(54) METHOD FOR REDUCING UPS COMPONENT STRESSES DURING TRANSITION FROM INVERTER TO GREEN/BYPASS OPERATION

(71) Applicant: SCHNEIDER ELECTRIC IT CORPORATION, Foxboro, MA (US)

(72) Inventors: Wei-Hsiang Lin, Shanghai (CN); Adam Daniel Sanner, Nashua, NH (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,675

(22) Filed: Mar. 7, 2023

(65) Prior Publication Data

US 2023/0266809 A1    Aug. 24, 2023

Related U.S. Application Data

(63) Continuation of application No. 17/066,665, filed on Oct. 9, 2020, now Pat. No. 11,635,797.
(Continued)

(51) Int. Cl.
*G06F 1/30* (2006.01)
*G06F 1/28* (2006.01)
(Continued)

(52) U.S. Cl.
CPC .............. *G06F 1/30* (2013.01); *G06F 1/28* (2013.01); *H02M 1/0009* (2021.05); *H02M 1/4208* (2013.01)

(58) Field of Classification Search
CPC .......... G06F 1/30; G06F 1/28; H02M 1/0009; H02M 1/4208
See application file for complete search history.

(56) References Cited

U.S. PATENT DOCUMENTS

| 5,786,641 A | 7/1998 | Nakanishi et al. |
| 6,100,664 A | 8/2000 | Oglesbee et al. |

(Continued)

OTHER PUBLICATIONS

Extended European Search Report from corresponding European Application No. 20200943.7 dated Feb. 2, 2021.

*Primary Examiner* — Aurel Prifti
(74) *Attorney, Agent, or Firm* — Lando & Anastasi, LLP

(57) ABSTRACT

UPS systems, methods, and computer-readable mediums utilizing electromechanical bypass relays to switch from an on-line mode of operation to a green/bypass mode of operation include control logic to adaptively adjust the timing of when an inverter of a UPS turns off to prevent backfeeding a utility. After the UPS is instructed to transition from the on-line mode to the green mode, a monitoring period begins. During the monitoring period, a parameter related to the output current of the inverter is monitored and compared to a predetermined threshold. If the parameter exceeds the predetermined threshold before a fixed period time has elapsed, the inverter is turned off early. If the inverter current does not exceed the predetermined value within the fixed period of time, the inverter is turned off.

20 Claims, 7 Drawing Sheets

Related U.S. Application Data

(60) Provisional application No. 62/914,034, filed on Oct. 11, 2019.

(51) Int. Cl.
*H02M 1/00* (2006.01)
*H02M 1/42* (2007.01)

(56) References Cited

U.S. PATENT DOCUMENTS

| | | | |
|---|---|---|---|
| 6,295,215 B1 | 9/2001 | Faria et al. | |
| 6,445,086 B1 * | 9/2002 | Houston | H01M 10/46 |
| | | | 307/66 |
| 7,237,134 B2 * | 6/2007 | Heberlein, Jr. | H02J 9/061 |
| | | | 307/64 |
| 7,652,397 B2 | 1/2010 | Lin et al. | |
| 7,939,968 B2 | 5/2011 | Hjort et al. | |
| 9,024,474 B2 | 5/2015 | Schultz et al. | |
| 9,024,476 B2 | 5/2015 | Ghosh et al. | |
| 10,930,734 B2 | 2/2021 | Bao et al. | |
| 10,944,287 B2 | 3/2021 | Lin | |
| 2003/0048006 A1 | 3/2003 | Shelter et al. | |
| 2012/0306274 A1 | 12/2012 | Shetler, Jr. et al. | |
| 2014/0062201 A1 | 3/2014 | Giuntini et al. | |
| 2014/0191853 A1 * | 7/2014 | Chen | G09G 5/00 |
| | | | 340/12.5 |
| 2016/0079718 A1 | 3/2016 | Rohr et al. | |
| 2016/0094025 A1 | 3/2016 | Smith et al. | |
| 2016/0111916 A1 | 4/2016 | Prakash et al. | |
| 2016/0352127 A1 | 12/2016 | Prakash | |
| 2017/0018959 A1 * | 1/2017 | Yu | H02J 9/062 |
| 2017/0163086 A1 | 6/2017 | Bach | |
| 2017/0302212 A1 * | 10/2017 | Marcinkiewicz | F25B 49/025 |
| 2017/0346275 A1 | 11/2017 | Zhang et al. | |
| 2018/0052503 A1 * | 2/2018 | Sharma | G06F 1/3206 |
| 2018/0301930 A1 | 10/2018 | Gonzalez | |
| 2019/0064898 A1 * | 2/2019 | Nommensen | G06F 1/263 |
| 2020/0006979 A1 | 1/2020 | Lin | |
| 2021/0013735 A1 * | 1/2021 | Pachoud | H01H 47/002 |

* cited by examiner

METHOD FOR REDUCING UPS COMPONENT STRESSES DURING TRANSITION FROM INVERTER TO GREEN/BYPASS OPERATION

CROSS-REFERENCE TO RELATED APPLICATION

This application is a continuation of U.S. patent application Ser. No. 17/066,665, titled "METHOD FOR REDUCING UPS COMPONENT STRESSES DURING TRANSITION FROM INVERTER TO GREEN/BYPASS OPERATION" filed on Oct. 9, 2020, which claims priority to U.S. Provisional Application Ser. No. 62/914,034, titled "SYSTEMS AND METHODS FOR PREVENTING BYPASS-RELAY DAMAGE IN A POWER SUPPLY," filed on Oct. 11, 2019. Each application referenced above is hereby incorporated herein by reference in its entirety for all purposes.

BACKGROUND

1. Field of the Disclosure

The present disclosure relates generally to systems and methods for controlling an Uninterruptible Power Supply (UPS).

2. Description of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS.

SUMMARY

According to one embodiment, an uninterruptible power supply (UPS) comprises an input configured to receive input power, a backup input configured to receive backup power from a backup power source, an output configured to provide output power to a load from at least one of the input power or the backup power, an inverter coupled to the input, the backup input, and the output, and configured to provide inverter-output current, a sensor configured to detect a parameter indicative of the inverter-output current, a relay coupled between the input and the output, and at least one controller coupled to the sensor and configured to determine that the relay has closed, and turn off the inverter based on the determination that the relay has closed.

In one example, the at least one controller is configured to determine that the relay has closed based on the parameter indicative of the inverter-output current.

In another example, the at least one controller is configured to determine that the relay has closed based on a derivative value of the inverter-output current.

In one example, the at least one controller is coupled to the relay and configured to detect that the inverter-output current exceeds a threshold and determine that the relay has closed based on the detection that the inverter-output current exceeds the threshold.

In another example, the at least one controller is configured to determine that the relay has closed based on a lapse of a predetermined period of time after instructing the relay to close.

In one example, the UPS includes a power factor correction (PFC) circuit, and the sensor is configured to detect a current at an input of the PFC circuit as the parameter indicative of the inverter-output current.

In another example the uninterruptible power supply further comprises a second input configured to receive second input power and provide the second input power to the relay.

In one example, the sensor is configured to detect the inverter-output current at an output of the inverter.

In another example, the sensor is configured to detect a current at an input of the inverter as the parameter indicative of the inverter-output current.

According to one embodiment, a method for operating an uninterruptible power supply (UPS) comprises receiving input power at an input, receiving backup power from a backup power source, providing output power to a load from at least one of the input power or the backup power, detecting a parameter indicative of inverter-output current from an inverter of the UPS, determining that a relay has closed, and turning off the inverter included based on the determination that the relay has closed.

In one example, the method further comprises determining that the relay has closed based on the parameter indicative of the inverter-output current.

In another example, the method further comprises detecting that the parameter indicative of the inverter-output current exceeds a threshold in response to instructing the relay to close and determining that the relay has closed based on the detection that the inverter-output current exceeds the threshold.

In one example, the method further comprises determining that the relay has closed based on a lapse of a predetermined period of time.

According to one embodiment, a non-transitory computer-readable medium storing thereon sequences of computer-executable instructions for controlling an Uninterruptible Power Supply (UPS) comprising an input configured to receive input power, a backup input configured to receive backup power from a backup power source, an output configured to provide output power to a load from at least one of the input power or the backup power, an inverter coupled to the first input, the backup input, and the output, a sensor configured to detect a parameter related to inverter-output current of the inverter, a relay coupled between the input and the output and configured to provide output power, and at least one controller coupled to the sensor, the sequences of computer-executable instructions instructing the at least one controller to detect the parameter related to the inverter-output current, determine that the relay has closed, and turn off the inverter based on the determination that the relay has closed.

In one example, the sequences of computer-executable instructions instruct the at least one controller to determine that the relay has closed based on the parameter related to the inverter-output current.

In another example, the at least one controller is coupled to the relay and the sequences of computer-executable instructions instruct the at least one controller to detect that the parameter related to output current of the inverter exceeds a threshold in response to instructing the relay to close, and determining that the relay has closed based on the detection that the inverter-output current exceeds the threshold.

In one example, the UPS includes a power factor correction (PFC) circuit, and the sequences of computer-executable instructions instruct the at least one controller to detect a current at an input of the PFC circuit as the parameter related to the inverter-output current.

In another example, the sequences of computer-executable instructions instruct the at least one controller to determine that the relay has closed based on a lapse of a predetermined period of time.

In one example, the sequences of computer-executable instructions instruct the at least one controller to detect the inverter-output current at an output of the inverter.

In another example, the sequences of computer-executable instructions instruct the at least one controller to detect a current at an input of the inverter as the parameter related to the inverter-output current.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the present disclosure. In the figures, each identical or nearly identical component that is illustrated in various figures is represented by a like numeral. For purposes of clarity, not every component may be labeled in every figure. In the figures.

DETAILED DESCRIPTION

Figure 1:
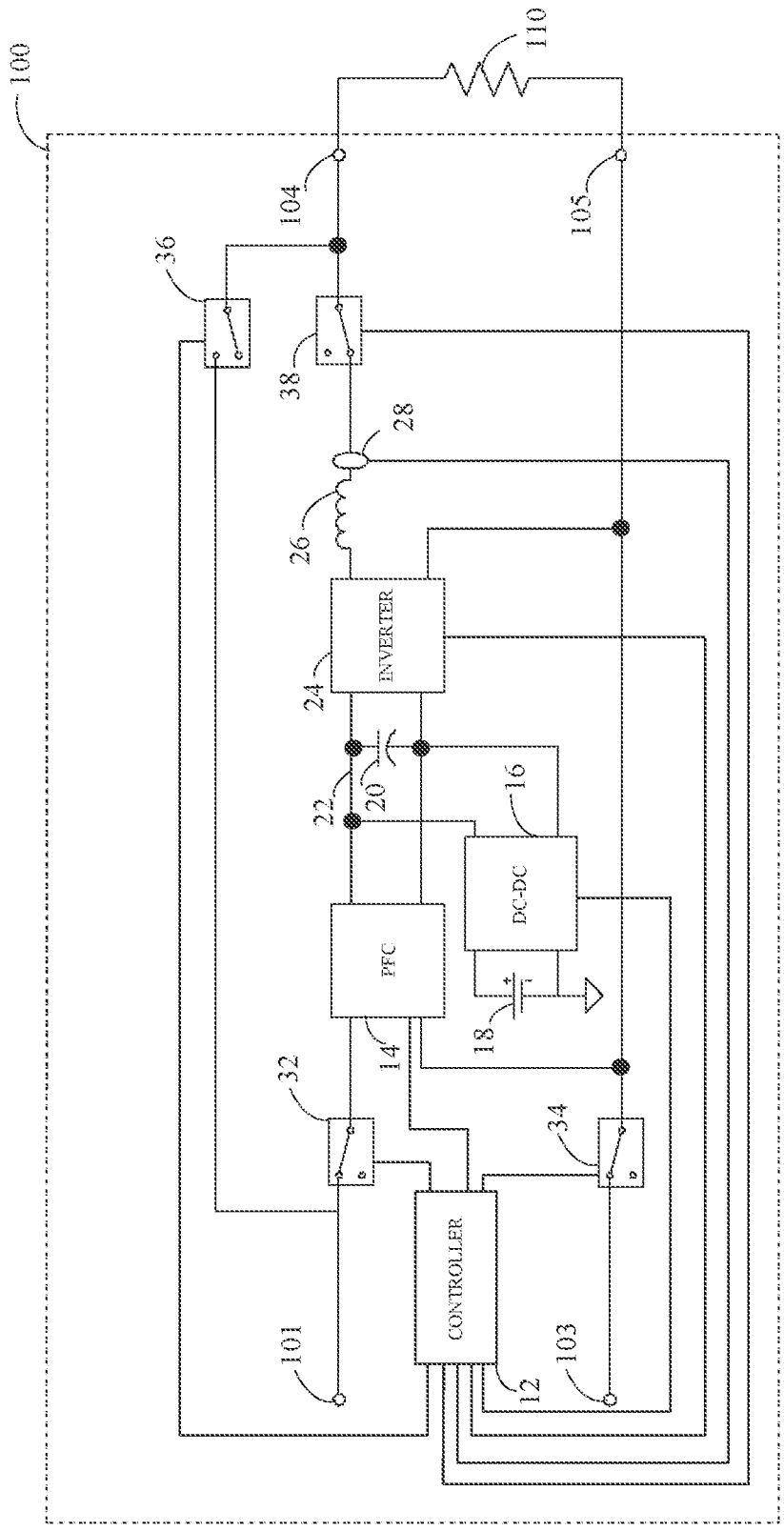
FIG. 1 is a block diagram of an on-line UPS in an on-line mode according to aspects described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

In existing UPS systems parallel operation of the inverter and utility power may briefly occur during a transition from an on-line mode of operation to a bypass mode of operation after a bypass relay is closed. After the bypass relay is closed a conductive path may be formed between the inverter, an inverter relay, the bypass relay, and a utility line connected to the bypass relay. During this time of parallel connection of the utility line and the inverter, current in components of the UPS may continue to increase until the inverter is turned off. This can cause stress on the components of the UPS and may result in the use of more robust and expensive components to handle the increase in current. For relays used in the transition from the on-line mode to the bypass mode, the increased current, if not properly controlled, may cause the relays to weld, permanently damaging them. Also, during this time of parallel connection, the inverter may backfeed into the utility.

At least some embodiments of the present disclosure provide methods, UPS's and non-transitory computer-readable media for adaptively adjusting the timing of turning off the output of an inverter of a power supply or UPS after a bypass relay lands (closes). At least some embodiments disclosed herein improve existing UPS systems by enabling them to handle inconsistent relay timing and unit-to-unit timing variations without additional hardware circuits while reducing the time that parallel operation occurs.

One embodiment of an uninterruptible power system 100 in accordance with the present disclosure will now be described in reference to FIG. 1, which illustrates a functional block diagram of a first UPS 100. The UPS 100 is an on-line UPS and includes a controller 12, a rectifier/power factor correction (PFC) circuit 14, a DC-DC converter 16, a battery 18, a polarized capacitor 20, a DC bus 22, an inverter 24, an inductor 26, a current sensor 28, a backfeed line relay 32, a backfeed neutral relay 34, a bypass relay 36, an inverter relay 38, input 101, a neutral input 103, an output 104, and a neutral output 105. The UPS 100 supplies power to a load 110 based on input power received at the input 101 and/or power from the battery 18.

In some embodiments, the inductor 26 is one of an air core inductor, an iron core inductor, and a ferrite core inductor.

The input 101 is coupled to the backfeed line relay 32, which is coupled to the PFC circuit 14. Each output of the PFC circuit 14 is coupled to the inverter 24. The outputs of the PFC circuit 14 are coupled together by the polarized capacitor 20, where the output of the PFC circuit coupled to the anode of the polarized capacitor 20 forms the DC bus 22, which is coupled to the DC-DC converter 16. The DC bus 22 also acts as a backup input that receives backup power from the battery 18 through the DC-DC converter 16. The battery 18 acts as a backup power source. The cathode of the polarized capacitor 20 is coupled to the PFC circuit 14, the inverter 24, and the DC-DC-converter 16. One output of the DC-DC converter 16 is coupled to the anode of the battery 18 and another output of the DC-DC converter 16 is coupled to both the cathode of the battery 18 and ground. The inverter 24 has an output coupled to the inductor 26 and another output coupled to the neutral output 105. The neutral output 105 is coupled to the PFC circuit 14, the inverter 24, the backfeed neutral relay 34, and the load 110. The inductor 26 is coupled to the current sensor 28, which is coupled to the inverter relay 38. The inverter relay 38 is coupled to both the bypass relay 36 and the output 104, which is coupled to the load 110. The load 110 is coupled between the output 104 and the neutral output 105. The bypass relay 36 is coupled to the input 101 and the backfeed line relay 32.

The controller 12 is shown in FIG. 1 as being coupled to the PFC circuit 14, the DC-DC converter 16, the inverter 24, the current sensor 28, the backfeed relay 32, the backfeed neutral relay 34, the bypass relay 36, and the inverter relay 38. Each solid line connected to the controller 12 represents a communication path that can transmit signals from the controller 12 or receive signals at the controller 12 from one or more internals components of the UPS 100. Each relay 32, 34, 36, 38 shown in FIG. 1 is configured to switch between an open position and a closed position when instructed by the controller 12. In the closed position, a conductive path is formed between a first terminal and a second terminal of the given relay. For example, when the bypass relay 36 is open (as illustrated in FIG. 1), current does not conduct between input 101 and the output 104 within the bypass relay 36. Conversely, when the bypass relay 36 is closed, current conducts at the relay connection to the input 101 and the relay connection to the output 104, when the load 110 is coupled between the output 104 and the neutral output 105, and power is present at the input 101.

The UPS 100, as illustrated in FIG. 1, is a single-phase UPS with a double conversion (AC to DC, DC to AC) topology. In other embodiments, the UPS 100 may be a multi-phase UPS, such as a three-phase UPS. The UPS 100 is illustrated in FIG. 1 as operating in the on-line mode, where the UPS 100 is configured to provide output power to the load 110 utilizing the inverter 24. As illustrated in FIG. 1, the backfeed line relay 32 is configured in a closed position to connect the input 101 with the PFC circuit 14. The bypass relay 36 is configured in an open position. The backfeed neutral relay 34 and the inverter relay 38 are illustrated as being in the closed position. When the backfeed line relay 32, backfeed neutral relay 34, bypass relay 36, and the inverter relay 38 are configured in these positions, the UPS 100 is configured to operate in the on-line mode of operation. To enter the bypass mode, a higher efficiency operational mode, the controller 12 activates (closes) the bypass relay 36 and turns off the inverter 24.

In some embodiments, one or more of the backfeed line relay 32, the backfeed neutral relay 34, the bypass relay 36, and the inverter relay 38 is an electromechanical relay (EMR). Electro-mechanical relays are devices that convert a magnetic flux into a mechanical force which operates the electrical contacts within the relay, often using a spring. Solid state relays (SSR), on the other hand, lack moving parts and achieve their functionality with semiconductors. Due to the mechanical nature of EMRs, the time for the internal switch to leave one contact and land on another can vary depending on the age of the EMR, the type of the EMR, spring strength, contact wear, coil damage, temperature, and other factors. Accordingly, when controlling an EMR to close, it is not entirely predictable how long it will take for the internal switch of the EMR to land from one position to the other. Therefore, if the controller 12 only used a fixed time to interrupt the output of the inverter 24 after commanding the bypass relay 36 to close, the inverter 24 can provide power to the input 101 through the bypass relay 36.

Figure 2:
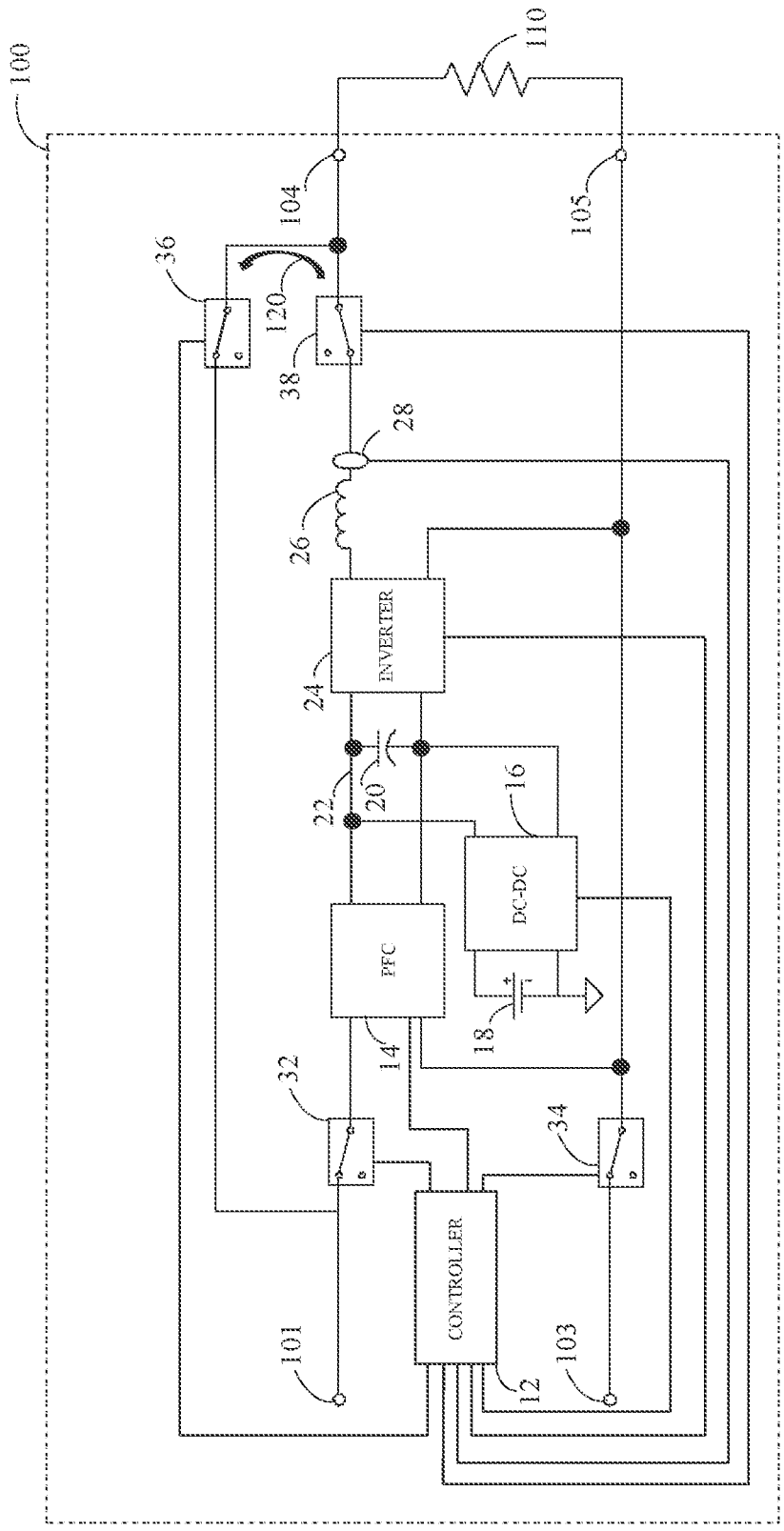
FIG. 2 is a block diagram of an on-line UPS transitioning to a green/bypass mode according to aspects described herein.

FIG. 2 illustrates a functional block diagram of the UPS 100 transitioning to the bypass mode of operation. FIG. 2 differs from FIG. 1 in that the bypass relay 36 is closed and a current 120 is present between the inverter relay 38 and the bypass relay 36. Under normal operation of the UPS 100, during transition from the on-line mode of operation to the bypass mode of operation, the controller 12 instructs the bypass relay 36 to close and then disables (turns off) the inverter 24 so that input AC power is provided directly to the output line 104 via the bypass relay 36. After the inverter 24 is instructed to turn off, the inverter relay 38 is instructed to open. In some embodiments, after the controller 12 instructs the inverter 24 to turn off, the controller 12 instructs the backfeed line relay 32 and the backfeed neutral relay 34 to open to prevent backfeeding power to the utility grid.

Figure 3:
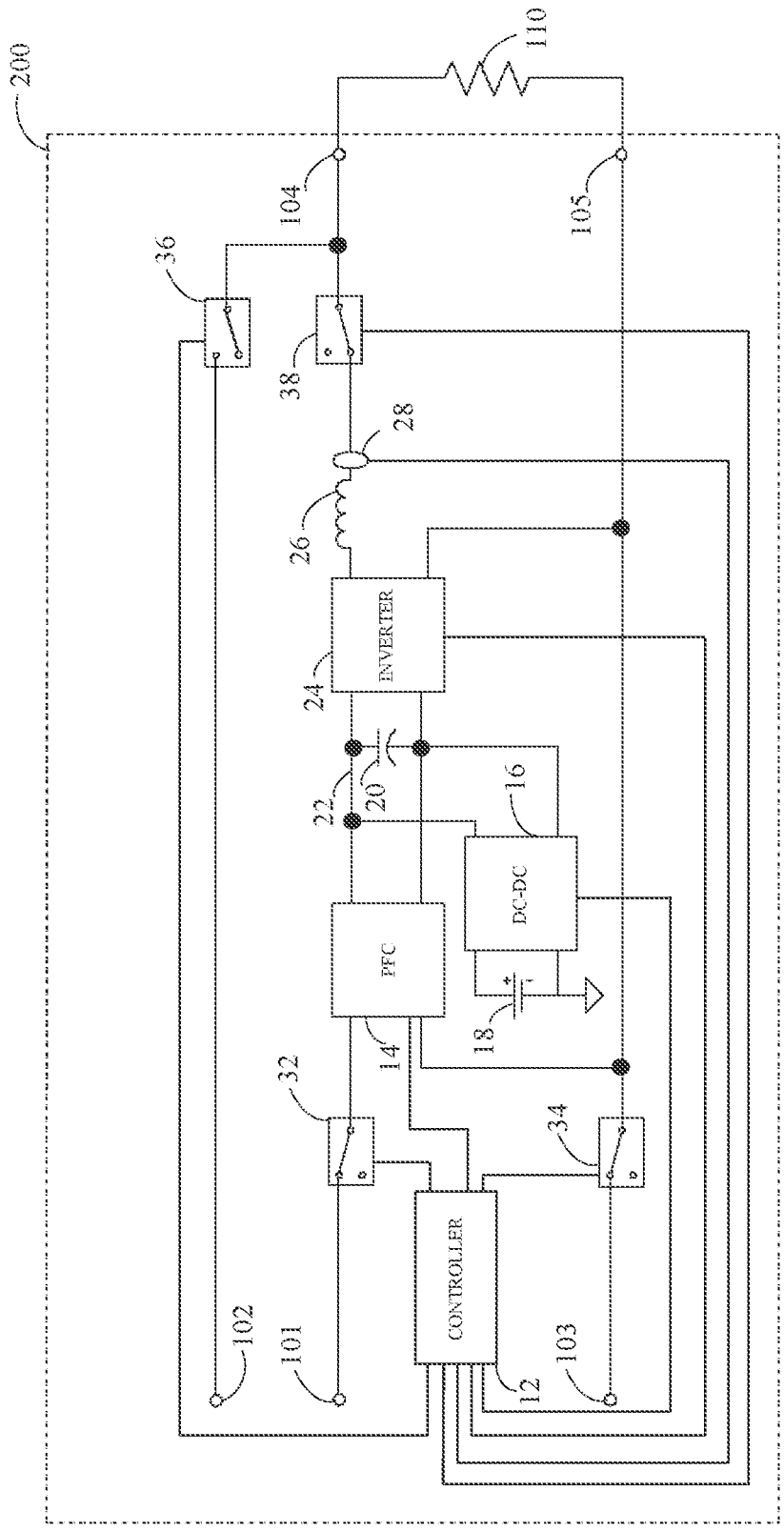
FIG. 3 is a block diagram of an on-line UPS in an on-line mode according to aspects described herein.
Figure 4:
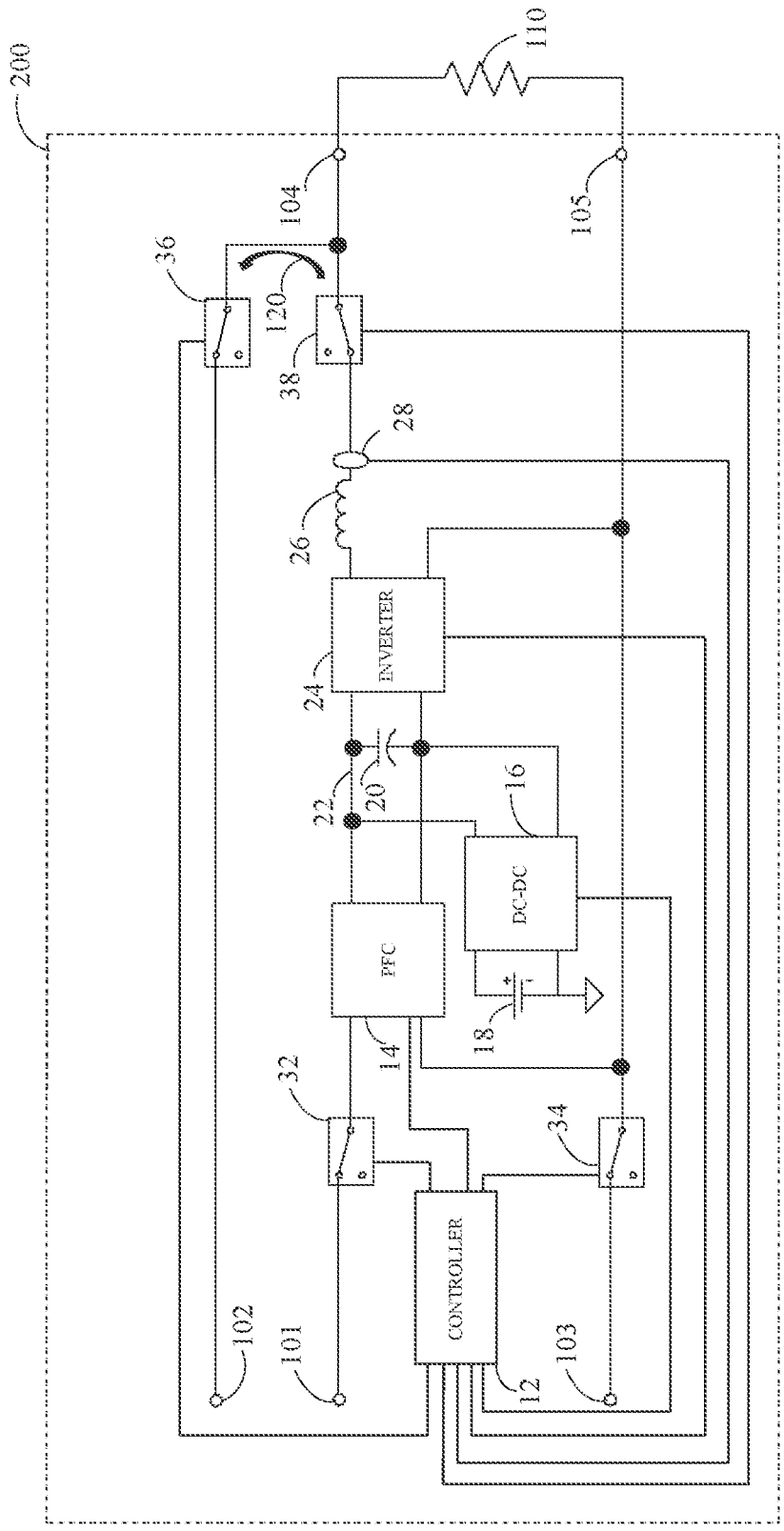
FIG. 4 is a block diagram of an on-line UPS transitioning to a green/bypass mode according to aspects described herein.

In an ideal scenario, the optimal transition from the on-line mode to the bypass mode would have the inverter 24 stop at the same time that the bypass relay 36 lands (closes). However, if the controller 12 stops the inverter 24 too early (before bypass relay 36 lands), the load 110 might be dropped and/or the load input capacitors could be drained, resulting in a large inrush current as the bypass relay 36 lands. If the controller 12 stops the inverter 24 too late (for a significant time after the bypass relay 36 lands), the parallel connection of utility power and inverter power may result in the inverter 24 sourcing or sinking large currents resulting in possible stressing or damage to the internal components of the UPS 100. In such a scenario, the inverter 24 may be attempting to supply power to the connected utility (backfeeding). FIG. 3 and FIG. 4 illustrate a second UPS 200 that is substantially the same as the first UPS 100, except that the second UPS 200 includes a second input 102. Common elements in the UPS 100 and the UPS 200 are labelled with the same reference numbers. The second input 102 is coupled to the bypass relay 36. As illustrated in FIG. 3 and FIG. 4, the second input 102 may receive input power and is separate from the input 101. In some embodiments, the input 101 and the second input 102 are designed to receive power from different power sources to provide additional redundancy. In an example, one of the input 101 and the second input 102 receives power from a utility grid and the other receives power from an alternative energy source. In some embodiments the alternative energy source is one or more of solar power, wind power, and hydroelectric power.

Certain embodiments include an optional capacitor connected between neutral output 105 and the conductive line connecting sensor 28 and inverter relay 38 in each of FIG. 1, FIG. 2, FIG. 3, and FIG. 4.

As illustrated in FIGS. 1 and 2, the current sensor 28 is coupled between the inductor 26 and the inverter relay 38 to measure an inverter-output current of the inverter 24 as a parameter indicative of the current being output by the inverter 24. In some examples, the UPS 100 or the UPS 200 includes one or more current sensors including the current sensor 28. Each of the one or more current sensors may be coupled at a different location in the UPS 100 or the UPS 200. In an example, in addition to or as an alternative to the current sensor 28 coupled between the inductor 26 and the inverter relay 38, a current sensor is coupled to the DC bus 22 to measure current received by an input of the inverter 24 as the parameter being indicative of the output current of the inverter 24. In some examples, a scaling factor is applied to the received current to estimate the output current of the inverter 24. Other scaling factors can similarly be applied for other locations of the one or more current sensors. In another example, the current sensor 28 is coupled to an input of the PFC circuit 14 that is connected to both the PFC circuit 14 and the backfeed line relay 32. A scaling factor or a separate threshold value may be compared to the value of the current sensor 28 at the input of the PFC circuit 14 to determine if the bypass relay 36 has closed. In some embodiments, a plurality of the one or more sensors is used, the plurality including the current sensor 28, and the parameter indicative of the output current is a weighted average of each current sensor measurement of current.

In FIGS. 1-4, straight lines which intersect and cross over one another are not electrically connected. Solid circles overlapping straight lines indicate the lines beneath the circles are electrically connected. Within each of the backfeed line relay 32, backfeed neutral relay 34, bypass relay 36, and the inverter relay 38, there are three electrical contacts represented by circles. The straight lines connecting one of the circles and components outside a respective relay indicate a connection. As an example, in FIG. 1, the input 101 is connected to the PFC circuit 14 via the backfeed relay 32. Discussion of the operation of the first UPS 100 continues below. The second UPS 200 operates in substantially the same manner with the exception of having the additional input 102 for receiving input power herein is intended to apply in every respect to the first UPS 100.

Figure 5:
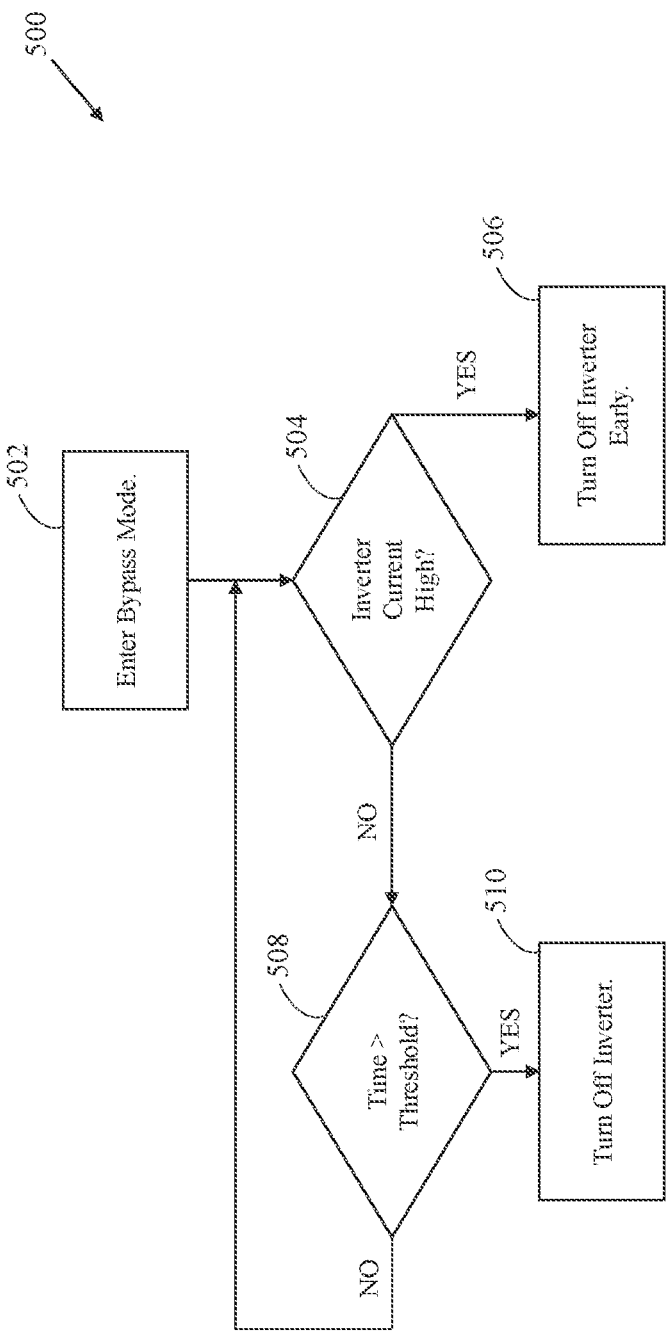
FIG. 5 is a logic flow chart illustrating operation controlling an inverter of a UPS according to aspects described herein.

The operation of the first UPS 100 will now be described in greater detail with reference to a method 500, which is illustrated as a logic flowchart in FIG. 5. The method 500 includes at least three acts 502, 506, and 510, and two conditions 504 and 508. In some embodiments, the controller 12 executes each act and condition in method 500. Certain embodiments implement the method 500 as a firmware algorithm stored as program instructions in an internal storage of the UPS 100.

In the method 500, the current sensor 28 is utilized to convert the inverter-output current into an ADC measurement value allowing the controller 12 to detect a rise in the ADC measurement value, indicating the landing of bypass relay 36 and the beginning of current 120 backfeeding into the utility.

In the first act 502 of the method 500, the controller 12 instructs the UPS 100 to transition from the on-line mode to the bypass mode. To transition to the bypass mode, the controller 12 instructs the bypass relay 36 to close. After the bypass relay 36 is instructed to close, the controller 12 begins monitoring current detected by the current sensor 28. In some embodiments, the controller 12 waits for a predetermined period of time before monitoring current with the current sensor 28. In one example, the predetermined time is in a range of about 0.1 ms to about 5 ms. In another example, the predetermined time is in a range of about 0.01 ms to about 10 ms. In one example, the predetermined time is in a range of about 0.001 ms to about 50 ms.

The controller 12 then compares the most recent current value detected by the current sensor 28 to a predetermined value of current as the first condition 504. In some embodiments, the predetermined value is about 125% of the nominal current output by the inverter 24. In certain embodiments, the predetermined value is a current threshold adjusted for the particular load 110. In one example, the load is about 5.5 kW consumed by a server rack, a maximum capacity of the inverter 24 is about 30 A, and the current threshold is set to about 80% of the maximum capacity, which is about 24 A. In another example, the current threshold is within a range. According to certain aspects, the range is about 3 to about 5 times an RMS value. For example, if the RMS value is about 30 A, then a range around 100 A is reasonable. In some examples, the range is about 30 A to about 100 A. In other examples, the range is about 24 A to about 30 A. In some examples, the range is about 10 A to about 50 A. If the current value detected by the sensor 28 exceeds the predetermined value (YES), then the first condition 504 is satisfied and the method 500 proceed to the second act 506. If the current value detected by the sensor 28 does not exceed the predetermined value (NO), then method 500 proceeds to evaluate the second condition 508. In some embodiments, the first condition 504 compares a current increase per unit of time detected by the sensor 28 to a threshold that represents a predetermined derivative value of current.

In the embodiments shown in FIGS. 1-4, the current sensor 28 is electrically coupled to an output of the inverter 24. The inverter output is coupled to the inductor 26, which is coupled to the current sensor 28 that is coupled between the inductor 26 and the inverter relay 38, to measure the output current of the inverter 224. In other embodiments, the sensor 28, or an additional sensor may be coupled to an input of the inverter 24. For example, in some embodiments the current sensor 28 is coupled to the DC bus 22. Other locations for current (or voltage) sensors within the UPS 100 are included within embodiments disclosed herein. While the specific value indicating the presence of the current 120 monitored by the sensor 28 may change depending on the location of the sensor 28 within the UPS 100, the acts and conditions of the method 500 are the same for each location. More specifically, in different embodiments, any sensor that determines parameters related to the output current from the inverter to detect an increase in the output current after switching the UPS 100 to the bypass mode may be used in addition to or in place of the current sensor 28.

The second condition 508 compares the time elapsed since the controller 12 instructed the UPS 100 to close the bypass relay 36 in the first act 502 to a predetermined threshold of time. The threshold indicates a maximum fixed period of time that can elapse since the bypass relay 36 was instructed to close. According to certain aspects, the predetermined threshold is about 1 ms to about 2 ms. In some embodiments, the predetermined threshold is 10 ms. In certain embodiments, the threshold is 13 ms. In some embodiments, the threshold is a value between 10 ms and 13 ms. If the current time (as of the second condition 508 being currently evaluated) exceeds the predetermined threshold, then the second condition 508 is satisfied (YES) and method 500 proceeds to the third act 510. If the current time does not exceed the predetermined threshold, then the second condition 508 is not satisfied (NO) and method 500 returns to evaluating the first condition 504. Certain embodiments use a fixed relay time as the predetermined threshold based on an average relay time (for the type of relay used as the bypass relay 36) to close plus a margin to determine the time to interrupt the inverter 24 after controller 12 commands the bypass relay 36 to close.

In some embodiments, when the second condition is not satisfied (NO), the method 500 returns to evaluating the second condition 508. In an example, the method 500 includes evaluating the first condition 504 one or more times before proceeding to evaluating the second condition 508 in the event the first condition 504 is not satisfied. Some examples include a predetermined waiting period in the first condition 504 before comparing the parameter indicative of the inverter 24 current to a predetermined threshold, and then proceeding to evaluating the second condition 508.

The time to interrupt the inverter 24, after commanding the bypass relay 36 to close, should not be less than the relay flying time or a large inrush current from utility to the load 110 could occur possibly resulting in a damaged relay and/or damage to other UPS components.

In some embodiments, the method 500 results in one of two possible outcomes. In one outcome, the first condition 504 is satisfied and the controller 12 instructs the inverter 24 to turn off early (before the predetermined threshold of time has been exceeded). In the other outcome, the second condition 508 is satisfied and the controller 12 instructs the inverter 24 to turn off as a result of the predetermined period of time elapsing. Certain embodiments include additional conditions or acts. In an example, a third condition 505 (not shown) may be evaluated between the first and second conditions 504 and 508 that evaluates whether the inverter current is a different value than the value checked at the first condition 504. In such an example, the first condition 504 evaluates the current for a first current value, and if that current value is not exceeded, then a second, higher current value is evaluated in the third condition 505. If the current in the third condition 505 is exceeded, then method 500 proceeds to the second act 506 and if not, proceeds to the second condition 508.

Figure 6:
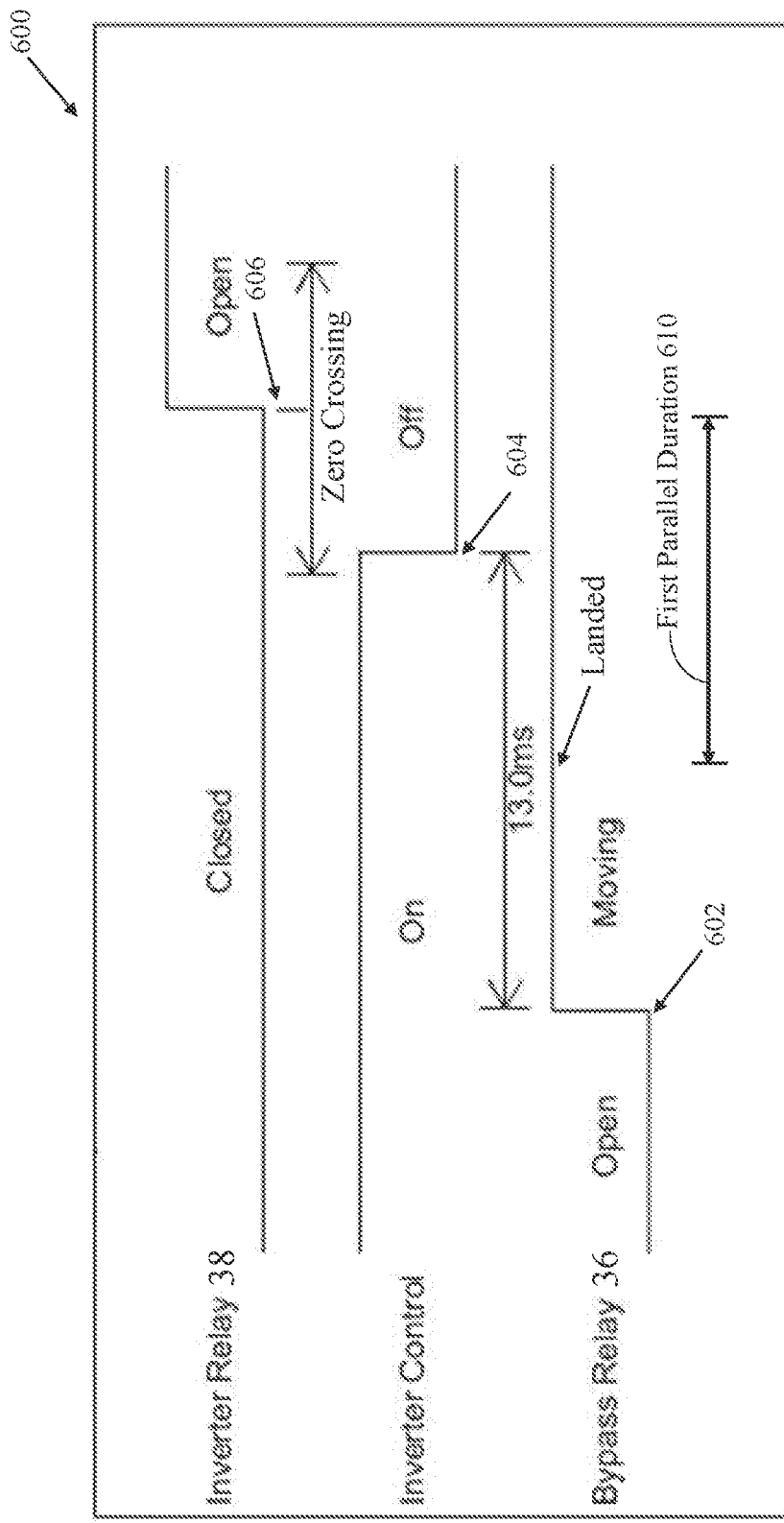
FIG. 6 is a timing chart illustrating a transition from an on-line mode to a green/bypass mode without utilizing the logic flow chart of FIG. 5 according to aspects described herein.

FIG. 6 shows a timing sequence 600 of the first UPS 100 and the second UPS 200 for the transition between the on-line mode and the bypass mode when the second condition 508 in the method 500 is satisfied. In the timing sequence 600 at a first point in time 602, the controller 12 provides a command to the bypass relay 36, instructing the bypass relay 36 to close. After a fixed period of 13 ms, the controller 12 commands the inverter 24 to turn off at a second point in time 604. The inverter relay 38 is then commanded to open at a following zero crossing point 606 of the output voltage waveform. The illustrated first parallel duration 610 shows the duration of time beginning when the bypass relay 36 has landed and ending when the controller 12 instructs the inverter relay 38 to open. The amount of time that the first parallel operation 610 occurs is dependent on the actual closure time of bypass relay 36, which can vary between different relay samples. During this parallel duration 610, the inverter 24 and the utility are both connected to the load 110, which may result in a current 120 feeding back to the utility. The resulting current 120 is related to the connected load 110 and the difference between the output voltage of the inverter 24 and utility voltage at the input 101. The current 120 could result in the bypass relay 36 becoming damaged and/or stressing components of the inverter 24 or any other component of the UPS 100. The scenario depicted in FIG. 6 for the second condition is similar to the operation of typical UPS's. In embodiments disclosed herein, the operation of UPS's for detecting the first condition, either in conjunction with the second condition or alone, provide improvements in the transition time from online mode to bypass mode.

Figure 7:
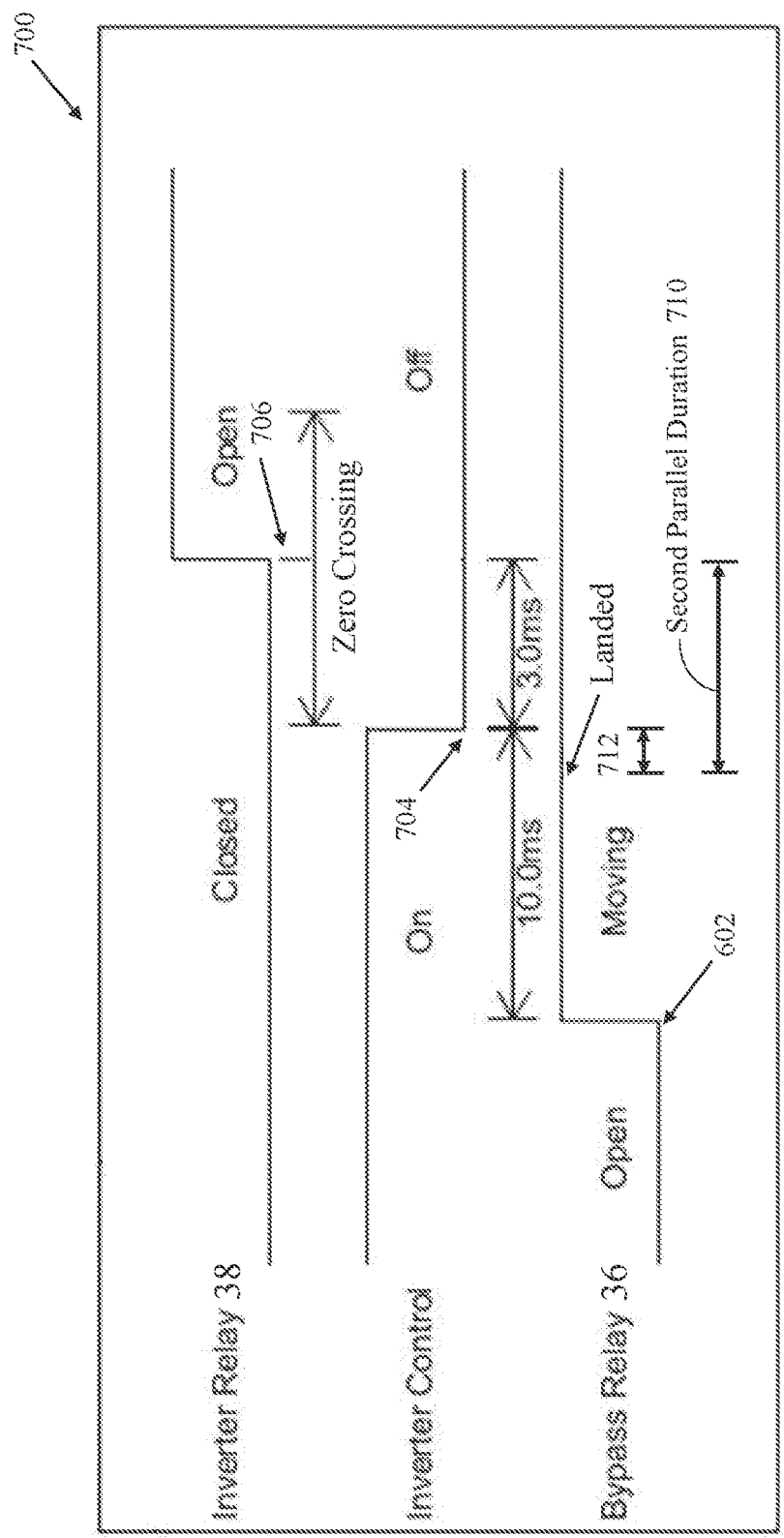
FIG. 7 is a timing chart illustrating a transition from an on-line mode to a green/bypass mode according to aspects described herein.

FIG. 7 shows the timing sequence 700 of the first UPS 100 and the second UPS 200 for the transition between the on-line mode of operation and the bypass mode of operation when the first condition 504 of the method 500 is satisfied. In the timing sequence, as in FIG. 6, at the first point in time 602, the controller 12 provides a command to the bypass relay 36, instructing the bypass relay 36 to close. After the controller 12 instructs the bypass relay 36 to close, the method 500 begins. Once the bypass relay 36 has landed, current in the sensor 28 begins to rise. The second parallel duration 710 and the detection period 712 both begin at the point when the bypass relay 36 has landed. The detection period 712 indicates the length of time for the controller 12 to detect that a value from the sensor 28 has exceeded the predetermined threshold in the first condition 504 of the method 500. At the end of the detection period 712, the first condition 504 of the method 500 is satisfied and the controller 12 instructs the inverter 24 to turn off in the second act 506 of the method 500 at a point in time 704 that is earlier than the fixed threshold time evaluated in the second condition 508. Once the controller 12 instructs the inverter 24 to turn off, the controller 12 then instructs the inverter relay 38 to open at the next estimated zero crossing point 706. As a result of the first condition 504 being satisfied during the detection period 712, the second parallel duration 710 is shorter than the first parallel duration 610.

While one or more embodiments described above pertain to UPS systems, it is to be understood that these and other embodiments may comprise general power supplies instead or in addition to UPS systems. Other embodiments include using techniques described herein in other power systems. Certain embodiments include using techniques described herein in other types of UPS's including, but not limited to, standby UPS's, line interactive UPS's, standby on-line hybrid UPS's, standby-ferro UPS's, delta conversion on-line UPS's, and offline UPS's. Other embodiments include using techniques described herein with devices other than relays.

Having thus described several aspects of at least one embodiment disclosed herein, it is to be appreciated various alterations, modifications, and improvements will readily occur to those skilled in the art. Such alterations, modifications, and improvements are intended to be part of this disclosure, and are intended to be within the spirit and scope of the present disclosure. Accordingly, the foregoing description and drawings are by way of example only.

What is claimed is:

1. A power supply comprising:
   an input configured to receive input power;
   an output configured to provide output power to a load;
   a power module coupled to the input and the output, and configured to provide output current;
   a sensor configured to detect a parameter indicative of the output current;
   a relay coupled between the input and the output; and
   at least one controller coupled to the sensor and configured to:
      determine that the relay has closed; and
      turn off the power module based on the determination that the relay has closed.

2. The power supply of claim 1, wherein the at least one controller is configured to:
   determine that the relay has closed based on the parameter indicative of the output current.

3. The power supply of claim 1 wherein the at least one controller is configured to:
determine that the relay has closed based on a derivative value of the output current.

4. The power supply of claim 1 wherein the at least one controller is coupled to the relay and configured to:
detect that the output current exceeds a threshold; and
determine that the relay has closed based on the detection that the output current exceeds the threshold.

5. The power supply of claim 1 wherein the at least one controller is configured to:
determine that the relay has closed based on a lapse of a predetermined period of time after instructing the relay to close.

6. The power supply of claim 1 wherein the power supply includes a power factor correction (PFC) circuit, and the sensor is configured to detect a current at an input of the PFC circuit as the parameter indicative of the output current.

7. The power supply of claim 1 further comprising a second input configured to receive second input power and provide the second input power to the relay.

8. The power supply of claim 1 wherein the sensor is configured to detect the output current at an output of the power module.

9. The power supply of claim 1 wherein the sensor is configured to detect a current at an input of the power module as the parameter indicative of the output current.

10. A method for operating a power supply comprising:
receiving input power at an input;
providing output power to a load;
detecting a parameter indicative of inverter-output current from a power module of the power supply;
determining that a relay has closed; and
turning off the power module based on the determination that the relay has closed.

11. The method of claim 10 further comprising:
determining that the relay has closed based on the parameter indicative of the output current.

12. The method of claim 10 further comprising:
detecting that the parameter indicative of the output current exceeds a threshold in response to instructing the relay to close; and
determining that the relay has closed based on the detection that the output current exceeds the threshold.

13. The method of claim 10 further comprising:
determining that the relay has closed based on a lapse of a predetermined period of time.

14. A non-transitory computer-readable medium storing thereon sequences of computer-executable instructions for controlling a power supply comprising an input configured to receive input power, an output configured to provide output power to a load a power module coupled to the first input and the output, a sensor configured to detect a parameter related to output current of the power module, a relay coupled between the input and the output and configured to provide output power, and at least one controller coupled to the sensor, the sequences of computer-executable instructions instructing the at least one controller to:
detect the parameter related to the output current;
determine that the relay has closed; and
turn off the inverter based on the determination that the relay has closed.

15. The non-transitory computer-readable medium of claim 14 wherein the sequences of computer-executable instructions instruct the at least one controller to:
determine that the relay has closed based on the parameter related to the output current.

16. The non-transitory computer-readable medium of claim 14 wherein the at least one controller is coupled to the relay and the sequences of computer-executable instructions instruct the at least one controller to:
detect that the parameter related to output current of the power module exceeds a threshold in response to instructing the relay to close; and
determining that the relay has closed based on the detection that the output current exceeds the threshold.

17. The non-transitory computer-readable medium of claim 14 wherein the power supply includes a power factor correction (PFC) circuit, and the sequences of computer-executable instructions instruct the at least one controller to detect a current at an input of the PFC circuit as the parameter related to the output current.

18. The non-transitory computer-readable medium of claim 16 wherein the sequences of computer-executable instructions instruct the at least one controller to:
determine that the relay has closed based on a lapse of a predetermined period of time.

19. The non-transitory computer-readable medium of claim 14 wherein the sequences of computer-executable instructions instruct the at least one controller to detect the output current at an output of the power module.

20. The non-transitory computer-readable medium of claim 14 wherein the sequences of computer-executable instructions instruct the at least one controller to detect a current at an input of the power module as the parameter related to the output current.

* * * * *